United States Patent [19]
Gump et al.

[11] Patent Number: 5,142,662
[45] Date of Patent: Aug. 25, 1992

[54] ELECTRONIC PUBLISHING SYSTEM

[75] Inventors: David F. Gump; Donald H. Gardner, both of Medina, Ohio

[73] Assignee: Bell & Howell Company, Cleveland, Ohio

[21] Appl. No.: 660,243

[22] Filed: Feb. 22, 1991

Related U.S. Application Data

[63] Continuation of Ser. No. 835,658, Mar. 3, 1986, abandoned.

[51] Int. Cl.$^5$ .................... G06F 3/14; G06F 15/64
[52] U.S. Cl. ............................ 395/100; 364/DIG. 1; 364/DIG. 2; 364/225.6; 364/918.4; 364/927.2; 364/927.64
[58] Field of Search ... 364/200 MS File, 900 MS File, 364/518, 519, 520, 521, 188; 340/747, 723, 724, 705, 708, 710; 358/102; 395/DIG. 1 MS File, DIG. 2 MS File, 100, 800, 118, 119, 133, 144, 145, 147, 149

[56] References Cited

U.S. PATENT DOCUMENTS

| | | | |
|---|---|---|---|
| 3,534,338 | 11/1967 | Christensen et al. | 364/200 |
| 3,757,037 | 9/1973 | Bialek | 358/102 |
| 4,202,041 | 5/1980 | Kaplow et al. | 364/900 |
| 4,481,603 | 11/1984 | McCaskill et al. | 364/900 |
| 4,586,035 | 4/1986 | Baker et al. | 340/712 |
| 4,672,558 | 6/1987 | Beckes et al. | 340/712 |
| 4,752,908 | 6/1988 | Bouillot | 364/900 |

OTHER PUBLICATIONS

"Ordering Parts Via Videodisc and Computer" by Stephen Matheny et al EITV Jun. 1984 pp. 33-35.

Primary Examiner—David Y. Eng
Assistant Examiner—Robert B. Harrell
Attorney, Agent, or Firm—Fay, Sharpe, Beall, Fagan, Minnich & McKee

[57] ABSTRACT

An electronic publishing system stores interrelated illustrations and items of text data, establishes data linking such items of text data to correlated locations in the illustrations, and stores such linking data in the recording part of the system. Records of interrelated illustrations and items of text data fixed in tangible media for reproduction by user-operated electronic equipment may be produced in this manner. One of the stored illustrations may thus be retrieved, and a display may be provided of that retrieved illustration. The user then selects a desired location in the displayed illustration, and the electronic equipment employs the stored linking data for retrieving any stored item of data correlated to the desired location in the displayed illustration. The item of text data thus retrieved may be displayed, preferably in conjunction with the illustration to which it pertains. Data linkage may also be between illustration and interrelated illustration.

8 Claims, 4 Drawing Sheets ns of manuals and other publications are separately stored for the compositor or galley makers. Typically, corresponding illustrations are identified in the textual tape or record. Similar approaches have been employed in computer output microfilm (COM) systems.

ELECTRONIC PUBLISHING SYSTEM

This is a continuation of application Ser. No. 835,658, filed Mar. 3, 1986, now abandoned.

BACKGROUND OF THE INVENTION

1. Field of the Invention

The subject invention relates to the distribution of interrelated illustrations and items of text data, to the preparation of such illustrations and items of text data for reproduction by user-operated electronic equipment, to records of interrelated illustrations and items of text data fixed in tangible media for reproduction by user-operated electronic equipment, to electronic systems for retrieving interrelated illustrations and items of text data in a correlated manner, and to electronic publishing systems in general.

2. Description of the Related Art (including information disclosed under 37 CFR 1.97-1.99)

Printed texts have been published in book form for hundreds of years. Various manuals and other publications typically contain illustrations along with related texts.

Since no special equipment is needed to derive information from conventional books, that form of publishing texts and illustrations is still very popular, despite the advent and development of electronic data handling and processing systems. However, a fundamental simplicity gives way to complexity, when large amounts of data are to be published, and particularly when various individual items are to be looked up frequently in immense data listings. Complexities arising in this respect are easily appreciated by frequent users of illustrated parts manuals, and also by those who have to rely on an index in order to locate text passages and illustrations in larger books.

Also, if the number of items of illustration or text data is large, publication in book form tends to produce bulky volumes which by their size, weight and number render their use rather tiresome.

Increasing paper cost and shortage have aggravated the problem in recent years, and are limiting publication in many areas to manuals and similar books that wear rapidly in intensive use and that become easily defective and even unusable through ordinary wear and tear.

Microfilm systems considerably reduce bulk and required storage space, but are not easily accessed for most practical applications. Microfiche systems generally are superior in this respect and are particularly well adapted to use with computer output microfilm (COM) apparatus. For instance, COM-generated illustrations or photographs of illustrations may be provided in conjunction with COM-generated text from magnetic tape or other recording media.

Mentioned in this connection may be the Automated Technical Publishing System of Bell & Howell Company, which provides computer-generated text and graphics on hard copy, microfilm, and microfiche from illustrations with the aid of a photodiode scanner, text supplied through a word processor, and input materials supplied on magnetic tape containing text data and standard copymark coding and graphics callout data, and hard copy illustrations and/or a tape of computer aided drawings which are identified to correspond to the callouts in the text tape.

Reference may also be had to the Data Base Micropublishing system by Bell & Howell Company, in which text information is entered into a computer through a keyboard, and is composed by line and page for output. That procedure also involves indexing the data and cross-referencing text and illustrations and their microfiche frame location, as well as listing illustration filming instructions and Composing Reduction Printer control instructions.

Text and illustration data thus composed are applied to a computer output microfilm unit which creates a 35 mm microfilm for that application. Pertinent illustrations are filmed separately in sequence and are also produced on 35 mm microfilm. The text and illustrations are then composed by the Composing Reduction Printer to create microfiche masters.

Such largely automated systems have been reducing publishing costs considerably. However, microfiche systems reach their limit when the volume of data and illustrations becomes very large. In that kind of situation, many people find the retrieval of information through microfiche viewers tiresome.

Also, some users have a tendency of scratching or otherwise damaging the microfiche, and of misplacing items in a microfiche collection, which makes it hard for other users.

Prior-art electronic data storage, retrieval and display systems have not sufficiently duplicated the purpose and utility of manuals, microfiche systems and similar publications for many tasks and purposes. This applies also to the various PC (personal computer) type of display products that have recently appeared on the market.

In modern publishing methods, including photocomposition, prepress text and illustrations are separately stored for the compositor or galley makers. Typically, corresponding illustrations are identified in the textual tape or record. Similar approaches have been employed in computer output microfilm (COM) systems.

However, none of these approaches so far has been capable of effectively linking items of text data to corresponding items or details of illustration, in a readily retrievable manner and optionally without the need of keyboards and other devices that presuppose knowledge or individual retrieval of voluminous identification codes or call numbers.

A recent example of an image storage and retrieval system is apparent from U.S. Pat. No. 4,553,206, by John M. Smutek et al, issued Nov. 12, 1985, and disclosing a technique for organizing digitized information for storage in a relational type tree memory structure. A header is utilized which identifies a text or image and details of how the image was digitized and compressed. An index contains the image or text identity and identifies the locations throughout memory at which the blocks containing the text or image information are stored. Each header has the address of any other block containing related information, thereby permitting chaining between blocks. Selective insertion of related data or images into subfields of displayed images and the use of data contained in subfields as keys to locate and display further related information are disclosed.

U.S. Pat. No. 4,500,875, by Herman J. R. Schmitz, issued Feb. 19, 1985, discloses apparatus for displaying digital information incorporating selection of picture pages and/or resolution enhancement.

SUMMARY OF THE INVENTION

It is a general object of this invention to overcome the disadvantages and to meet the needs expressed or implicit in the above Information Disclosure Statement and in other parts hereof.

It is a germane object of this invention to provide an electronic publishing system for the commercial production and issuance of interrelated texts and illustrations.

It is a related object of this invention to provide an electronic catalog system.

It is also an object of this invention to provide methods and apparatus for publishing or displaying interrelated illustrations and items of text data.

It is a related aspect of this invention to provide improved methods and apparatus for publishing or displaying interrelated illustrations and items of text data through user-operated electronic equipment.

It is also an object of this invention to provide records of interrelated illustrations and items of text data fixed in tangible media for reproduction by user-operated electronic equipment, and to provide apparatus for this purpose.

It is a germane object of this invention to provide improved systems and media for conveying pictorial and textual information to the public in a more advantageous and convenient manner.

Other objects of the invention will become apparant in the further course of this disclosure.

The subject invention resides in methods and apparatus for publishing interrelated pictorial illustrations and items of text data in a electronic parts catalog system.

From a first aspect thereof, that invention resides more specifically in the improvement comprising in combination the steps of, or means for storing interrelated pictorial illustrations and items of text data descriptive of said parts in the electronic parts catalog system, on recording media in machine-readable form, providing data linking the items of text data to correlated locations in the illustrations corresponding to the parts shown storing these linking data on a recording medium in machine readable form, machine-reading a single one of the stored illustrations showing several parts from said recording media, providing a display of said single one machine-read illustration with a showing of several locations corresponding to several parts in said single illustration, prompting a viewer to select one of said several locations in said displayed single illustration as a desired location, selecting said one location in said displayed single illustration and with said stored linking data retrieving any stored item of text data correlated to said selected one location in said displayed single illustration.

According to a related aspect thereof, the invention provides data linking the stored items of text data to correlated items shown in the stored illustrations, and establishes these linking data in terms of locations predetermined in the illustrations. The invention according to this aspect then selects a desired item in the displayed illustration in terms of a corresponding one of the latter locations, and employs the stored linking data and a determination of that one location for retrieving any stored item of text data correlated to the desired item in the illustration.

Pursuant to a related aspect thereof, the invention provides data linking the stored items of text data to locations of correlated items shown in the stored illustrations. The invention pursuant to this aspect, then selects in the displayed illustration a desired item situated at one of the latter locations, effects a determination of that one location, and employs that determination and stored linking data for retrieving a stored item of text data correlated to the selected desired item.

From a related aspect thereof, the invention resides in an improvement comprising in combination the steps of, or means for providing pictorial illustrations with indicia of items shown in these illustrations, there being several indicia per illustration, storing these illustrations, indicia, and items of text data on recording media in machine readable form, providing data linking items of text data to locations of indicia of items shown in the illustrations and correlated to said text data, storing these linking data on a recording medium in machine-readable form, machine reading a single, one of the stored illustrations and indicia of items shown in that one illustration, providing a display of the retrieved illustration and indicia, selecting in that display an indicium of a desired item, effecting a determination of a location of that selected indicium of the desired item, and retrieving with said stored linking data, upon a determination of said location of the selected indicium, a stored item of text data correlated to the desired item.

According to a further related aspect of the invention, users of stored interrelated illustrations and items of text data are provided with means for retrieving these illustrations and items of text data in interrelated form with the aid of stored data linking the items of text data to correlated locations in said illustrations, to enable users to retrieve and display stored illustrations, select a desired location in a displayed illustration, and employ the stored linking data for retrieving any stored item of text data correlated to the desired location in the displayed illustration.

Pursuant to the invention, the latter related further aspect is expanded to other aspects of the invention, including the preceding related aspects.

The invention also resides in methods and apparatus for publishing interrelated illustrations and items of text data through user-operated electronic equipment, using the methods and apparatus otherwise disclosed herein for the subject invention.

The invention also resides in records of interrelated illustrations and items of text data fixed in tangible media for reproduction by user-operated electronic equipment, and made by any method or apparatus otherwise disclosed herein for the subject invention.

Other objects of the invention will become apparent in the further course of this disclosure, and no restriction is intended by this summary of the invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
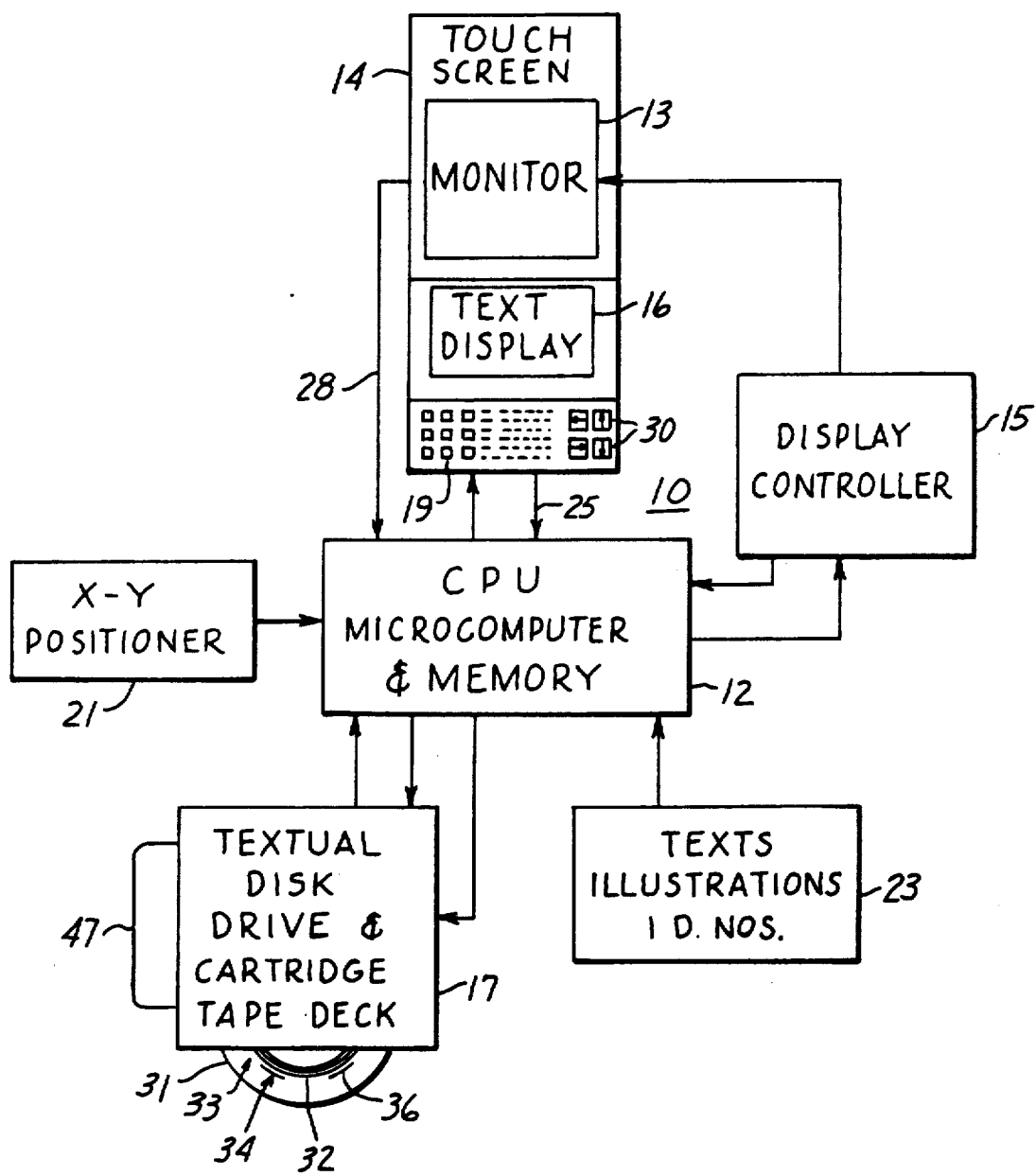
FIG. 1 is a block diagram of a system for establishing and storing data linking interrelated illustrations and text data according to a preferred embodiment of the subject invention.

FIG. 1 is a block diagram of part of a system for storing and displaying interrelated illustrations and text data according to a preferred embodiment of the subject invention.

In terms of components and functions, the illustrated system 10 comprises a microcomputer 12, a cathode ray tube (CRT) monitor 13, which may be equipped with a touch screen or coordinate sensor frame 14, a display controller 15, a text display cathode ray tube unit 16, and a playback unit 17 which may include a disk drive and a cartridge tape deck.

The system also has a keyboard 19 which may be part of the text display terminal. Precise positioning capability on the monitor 13 is provided in a conventional manner by an X-Y positioner 21 which may be provided by conventional equipment going under the terms "Mouse", "Trackball", "Joystick", and "Digitizing Tablet" familiar for these devices in personal computer and other data processing and display environments.

With the system shown in FIG. 1, data linking items of text data and correlated locations in illustrations are established and stored for subsequent publication or display. In other words, items of text data may be linked in a reproducible manner to correlated illustrations or correlated locations in given illustrations. Within the scope of the subject invention, it is also possible to link illustrations to interrelated illustrations or to link items of given illustrations to correlated locations of other illustrations, and the like.

In principle, it would, of course, be possible for the maker, provider or user of the system to generate also the illustrations and texts to be displayed thereby. However, in analogy to book publishing, the texts and illustrations more typically will be provided by an author or other outside source. Either way, the illustrations and texts to be worked on typically will have been fixed on a storage medium, as indicated at 23 in FIG. 1. As also shown there, such stored materials typically will be accompanied by some identifying information, such as ID numbers. By way of example, providers of artwork frequently assign an art number to each piece of art. The provider of the system additionally or alternatively may assign an art number to any art made up to aid the user of the system.

Figure 2:
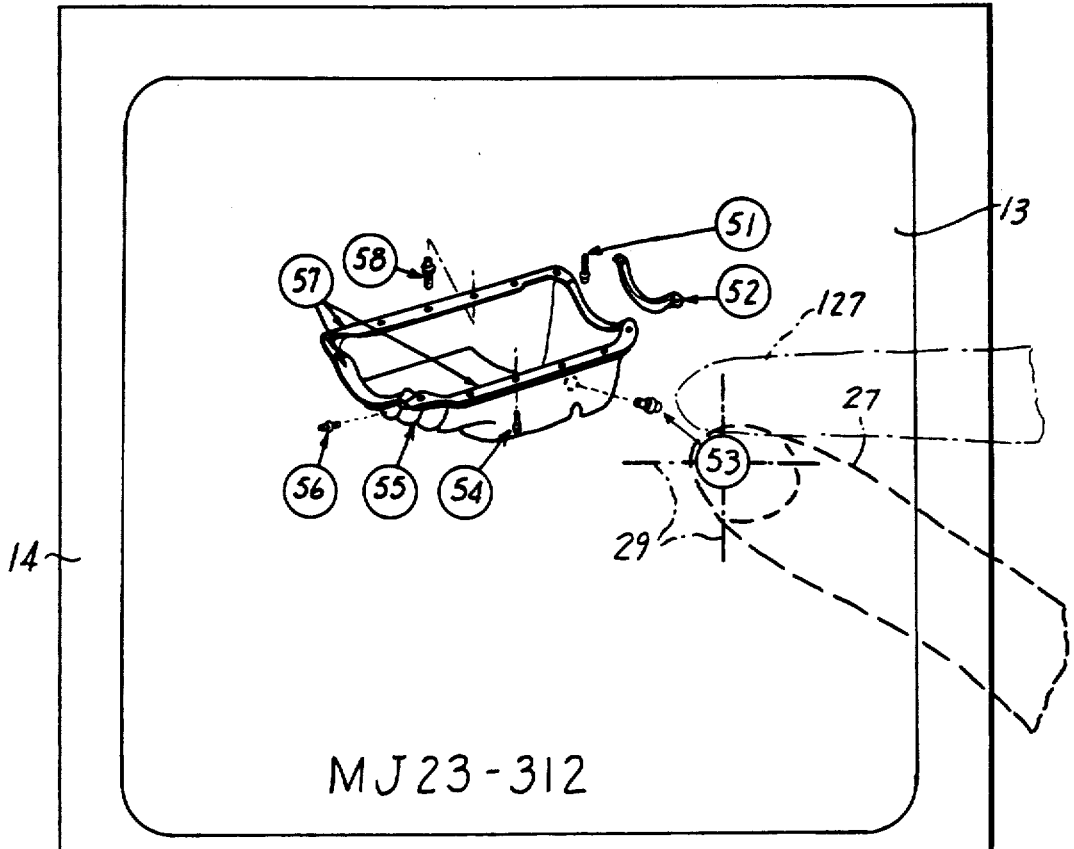
FIG. 2 is an elevation of a cathode ray monitors displaying an interrelated illustration and items of text data, and showing operating phases of the illustrated preferred embodiment.

In order to give a practical example, FIG. 2 shows a display of an illustration on the monitor 13 and of corresponding text on the CRT 16. The mundane example of an oil pan for an automotive engine has been chosen for this purpose, but it should be understood that the practice of the subject invention is not just limited to utilitarian items.

At any rate, FIG. 2 displays several numbers that may serve as ID or art numbers for present purposes as will be more fully discussed in the further course of this disclosure.

For the moment it is to be recognized that the pictorial and textual information displayed in FIG. 2 is stored 200, 202, as indicated at 23 in FIG. 1. Basically, such storage may be in the form of text books or catalogues. More typically to the environment of the illustrated system, such storage will be on magnetic tapes or other suitable recording media. In the context of the illustrated embodiments of the invention, the image and other data and the control information necessary for its transformation into a visual display may be subjected to mass storage at 23 or even in the memory of the microcomputer 12.

The task of the system 10 of FIG. 1 and of its operator is to link 204 corresponding items of text data and illustrations together in a reproducible manner for display in the system of FIG. 3, to be more fully described below. This process or phase of operation is herein designated as "co-ordinate capture."

At the beginning of each co-ordinate capture routine or image processing operation 204, the operator determines the art number of the illustration to be processed. For instance, FIG. 2 shows an art number MJ23-312 for the illustration displayed at 13.

By way of example, the operator may employ the keyboard 19 in order to key 206 the latter art number MJ23-312 into the system 10, typically into the microcomputer 12, as indicated by the arrow 25. The microcomputer, in turn, retrieves 208 the particular illustration from the data base at 12 or 23 and displays 210 it on the monitor 13 with the aid of the display controller 15. The microcomputer also uses the keyed-in art number to access the text data base in order to identify callout records associated with the displayed illustration. These correlated callout records are displayed at 16 and the microcomputer also prompts 212 the operator to point out a desired callout number.

By way of example, the legend "POINT OUT CALLOUT #" may be displayed to the operator by the CRT 16. Other optical indications or acoustic signals or instructions may be employed in practice to prompt the operator to point out a desired part of the displayed illustration about which more information is desired. Also, the promptings herein mentioned may be effected in various conventional ways, including step-by-step listings of the type familiarly employed in data processing and computer work. Accordingly, the prompting illustrated at 16 in FIG. 2 only is broadly representative of all the possible promptings that may be effected in the practice of the subject invention.

The operator then enters the desired callout number, such as via the keyboard 19. By way of example, if the operator wants to capture the co-ordinates of the oil pan drain plug he would enter the call number 53 from the list shown in FIG. 2, or from any other comparable list.

After entering the callout number, the operator is prompted to touch this callout on the monitor, as shown by a dotted outline of a finger 27. As its name implies, the touch screen 14 senses the location where the finger, 27 touches the screen of the monitor 13 and generates 214 X-Y co-ordinates which are transmitted to the CPU of the microcomputer 12, as indicated by a line 28. Suitable touch screens are more fully identified below.

The microcomputer 12 receives these co-ordinates and generates a cross hair cursor centered about them, as indicated by phantom lines 29 in FIG. 2. For instance, the CPU may instruct the display controller 15 to produce on the screen 13 the two cross hair lines 29 with an intensity that contrasts with the intensity of the underlying illustration.

For situations in which the touch screen operation is not perfectly accurate, the illustrated preferred embodiment provides the capability of adjusting the position of the cursor 29. For instance, the keyboard 19 may be provided with arrow keys 30 for "up", "down", "left", and "right" adjustment of the cursor 29, until that cursor is exactly centered on the particular illustration part or callout number, such as the selected number 53 in the display of FIG. 2.

Depression of each key 30 generates a unique code which is passed on to the CPU, such as via line 25, which, in turn, determines which key was pressed and which moves the monitor cursor correspondingly.

The above mentioned X-Y positioner 21 may be employed instead to adjust the cursor or cross hair 29 using standard features of display controllers, as incorporated at 15.

The co-ordinates of the crossing point of each cross hair 29, etc., are stored 216 by the microcomputer 12 in association with correlated items of text data to establish the desired linking data.

In this manner, the microcomputer 12 accurately determines and stores the co-ordinates of each call-out illustration part. Within the scope of the subject invention, this could be the co-ordinates of a desired displayed part themself, such as the co-ordinates of the oil pan drain plug in our example. However, the illustrated preferred embodiment shows an alternative, according to which the co-ordinates of a selected callout number are determined. For instance, the center of the displayed circle around the callout number 53 may exactly be determined and stored in the manner just described. Of course, since the callout numbers and their circles are displayed along with their associated illustration parts, they are in effect also part of the displayed illustration. In other words, in addition to showing the co-ordinate capture of callout numbers, FIG. 2 thus effectively depicts co-ordinate capture of displayed illustration parts or portions.

In practice, the co-ordinate capture steps or routine just described is performed for every illustration part or callout number and for every illustration or art number, until all co-ordinates are stored in the data base record associated with the corresponding callouts or illustration parts or with correlated items of text data.

The contents of such data base may be recorded on tape, on disks or on other recording media. By way of example, FIGS. 1 and 3 show a Winchester or other high-density disk 31 on which the information produced by co-ordinate capture has been recorded, such as with the aid of the microcomputer 12 and disk drive 17. For the purpose of illustration, the disk 31 is shown as bearing records 32 of coded signals representing text to be displayed at 16.

These records may contain the above mentioned stored and other text data or items of text data 33 to be displayed at 16. Through the co-ordinate capture procedure herein disclosed, the stored illustrations and items of text data 33 are interrelated or correlated with the aid of stored data 34 linking items of text data 33 to correlated locations in displayed illustrations. By way of example, such co-ordinate capture or linking data are shown as recordings 36 on the Winchester disk 31.

In practice, the illustrations may also be stored on tape or another convenient recording medium. By way of example, FIG. 3 shows illustrations 41 stored as records 42 on an optical disk 43. While an optical disk drive 45 for that purpose is shown in FIG. 3, it is understood that such equipment may, for instance, be employed in the system of FIG. 1 in order to record the illustrations displayed by the monitor 13 in a readily shippable and reproducible form. It is well known in the art that the type of apparatus shown in the drawings store the above mentioned data in machine-readable form, and that such data 33 and 34 and illustrations are, indeed, stored on media 31 and 43 in machine-readable form.

Figure 3:
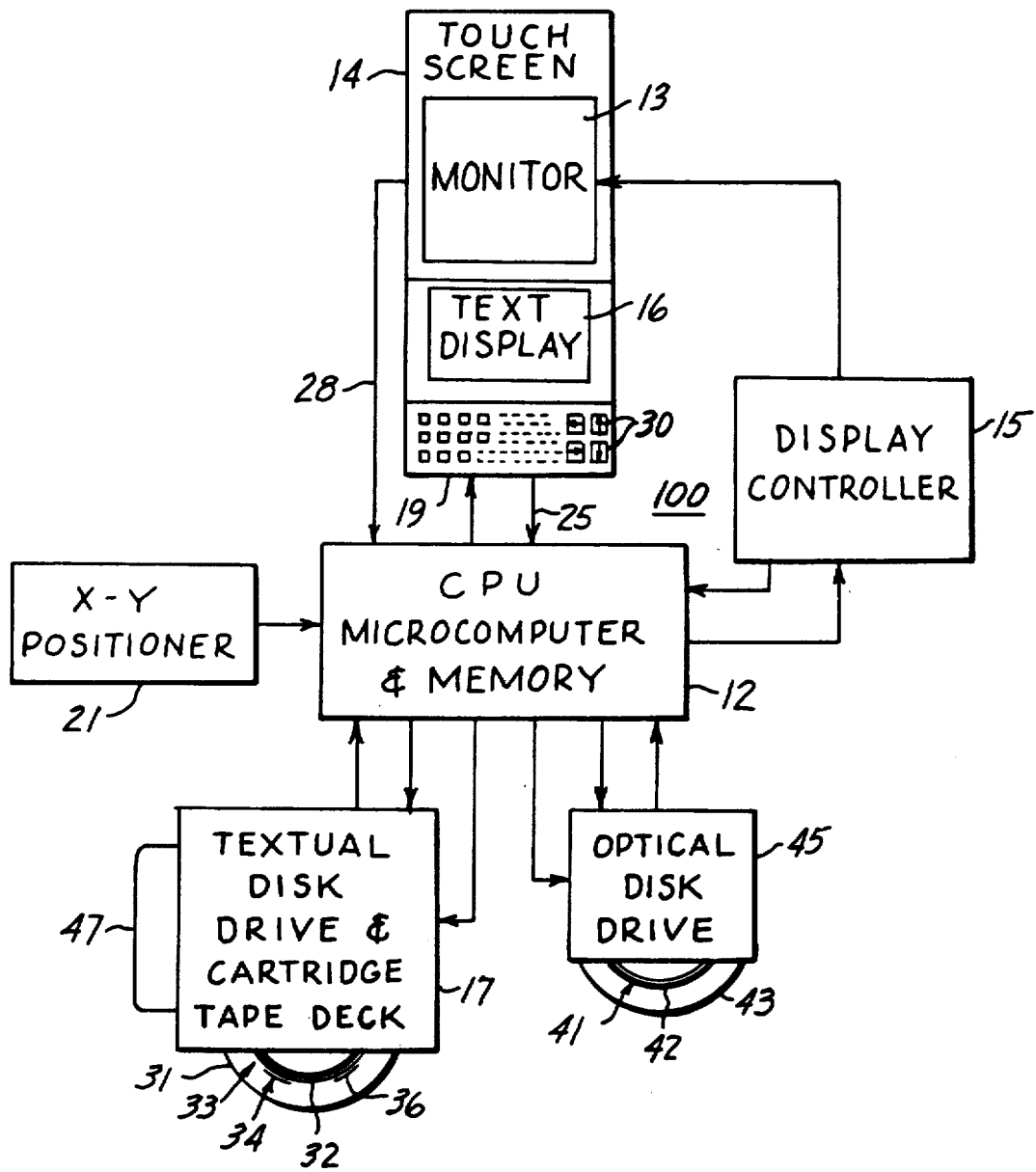
FIG. 3 is a block diagram of a system for retrieving illustrations and items of text data in interrelated form with the aid of linking data pursuant to a preferred embodiment of the subject invention.
Figure 4:
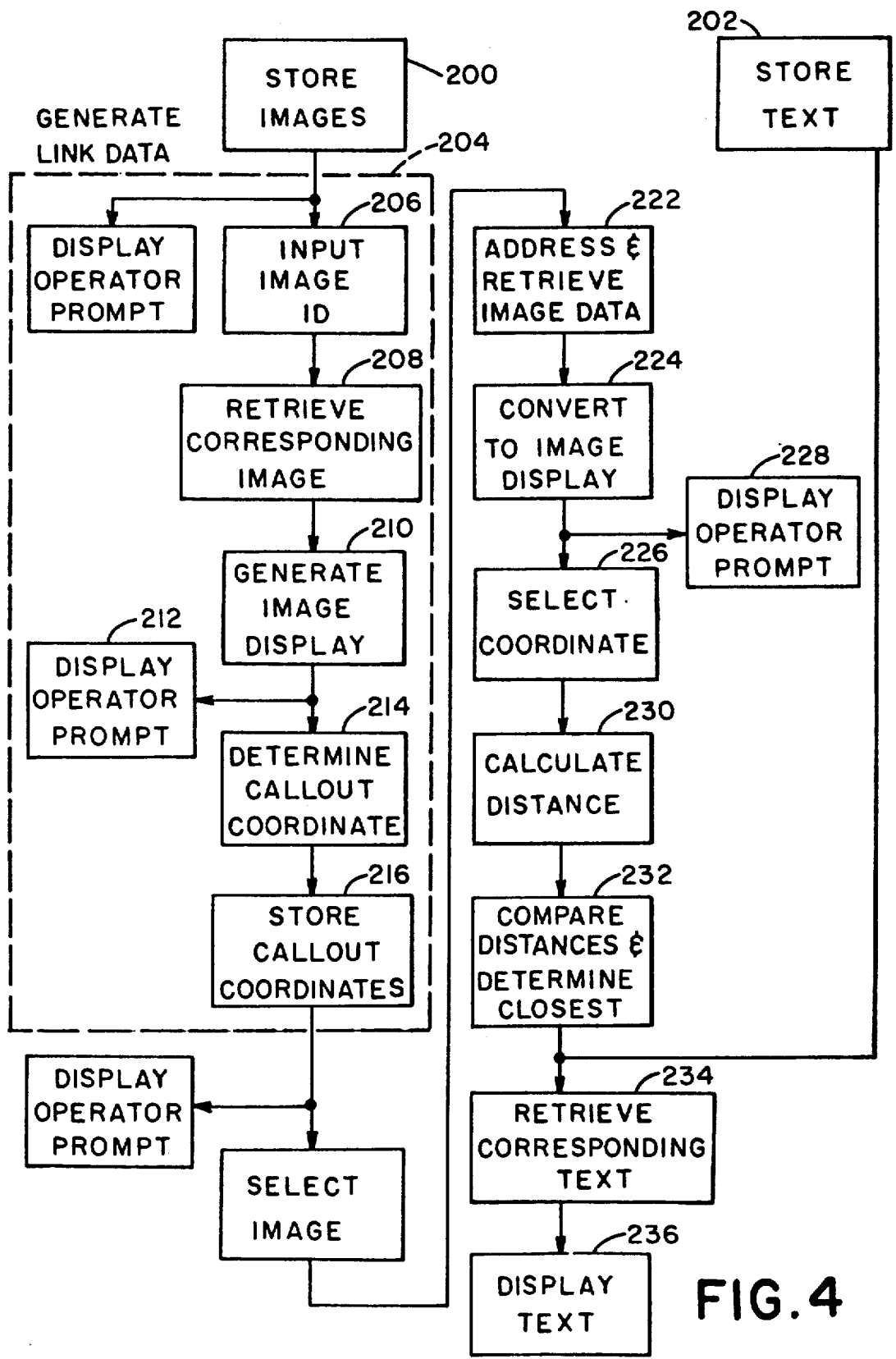
FIG. 4 is a flowchart illustrative of the method of using the system of FIG. 1.

However, FIG. 3 shows a preferred embodiment of the invention for providing users of the stored interrelated illustrations 41 and items of text data 33 with means 100 for retrieving these illustrations and items of text data in interrelated form with the aid of the stored data or captured co-ordinates 34 linking such items of text data to correlated locations in the illustrations, as explained above.

As seen from a comparison of FIGS. 1 and 3, the retrieval and display system 100 may in essence be composed of the same components as the co-ordinate capture system 10. In practice, the system 100 typically is in the form of a display terminal located at users or publishers of the interrelated texts and illustrations.

The microcomputer 12 retrieves 222 one of the stored illustrations from the optical disk 43 by appropriate control of the optical disk drive 45. The keyboard 19 may be employed for initiating such retrieval, such as by keying in the art work, part number, or the like.

The microcomputer 12, display controller 15 and monitor 13 provide a display 224 of the retrieved illustration on the face of the monitor 13.

The user of the system then selects 226 a desired location in the displayed illustration. For instance, the viewer of the display may be prompted 228 as explained in connection with FIG. 2 to point out the desired location in the displayed illustration and the touch screen 14 may then effect a determination of the location in the displayed illustration, such as by sensing where the screen at 13 is being touched by the operator's finger 27. In practice, the coordinate sensing frame 14 may be employed for that purpose, as explained in connection with FIG. 1. An alternative approach would be for the operator to key in the callout number, such as the number 53 through the keyboard 19, or to use the X-Y positioner 21 and cross hair or cursor 29 to point out the desired illustration part or callout number in the displayed illustration.

The signal representing the determination of the location in the displayed illustration pointed out by the viewer is forwarded to the microcomputer by line 28. The microcomputer 12 employs that determination and the stored linking data 34 for retrieving a stored item of text data 33 correlated to the desired location in the displayed illustration.

According to a preferred embodiment of the invention, intended callout numbers, co-ordinates, or desired parts of displayed illustrations are determined by calculation. For instance, if a finger touches the screen somewhat inaccurately, such as shown at 127 in FIG. 2, then the microcomputer 12 calculates 230 from the received and the stored co-ordinates the distances from the screen location touched to the adjacent callout number displays, such as to the displayed numbers 52, 53 and 54 in our example, and identifies 232 the callout number intended by the operator or user as that callout number which in the display is located closest to the middle point of the screen location touched by finger 127. As shown in FIG. 2, that would still be the callout number 53.

The same principle applies if the system 100 operates on the basis of touched part displays, such as the displayed bolt 51, seal 52, plug 53, screen 56, and stud 58, in which case the microprocessor in the retrieval system 100 determines the distance between an inaccurately touched screen location and the adjacent part displays and identifies the intended part as the part having the shortest distance from the location touched by finger 127. In the example shown in FIG. 2, this still would be the plug 53, as distinguished from the seal 52 and even from the oil pan 55.

By employing a distance measuring system, as opposed to an area sensing system, the illustrated embodiment thus effectively tolerates certain inaccuracies on the part of operators or users of its retrieval systems.

The correlated item of text data or illustration thus retrieved 234 may then be displayed 236 to the user. For instance, the item retrieved pursuant to the subject preferred embodiment may be an item of text data, such as a legend that goes with the part of the displayed illustration that has been called out. In this respect, the lower part of FIG. 2 already shows the legend "PLUG, Oil Pan Drain," for the pointed out part 53. In practice, that legend may be more elaborate containing, for example, more information about that item, an itemized listing of that item for different kind of oil pans or different models of automobiles, or any other useful information and listing concerning the pointed-out item. The variety of useful information thus conveyable by the subject invention in any kind of environment is almost unlimited, and FIG. 2 at best shows a representative example of that potential.

By repeating the steps described for the system 100, all texts and illustrations stored on disks 31 and 43, respectively, or in any other suitable media or common medium, may thus be called out for display in a correlated manner wherein corresponding illustrations and texts are displayed simultaneously.

Within the scope of the subject invention, the linkage herein disclosed may be from text data to illustration or from illustration to text data, as most suitable for given needs. Accordingly, the linking information and record 34 and 36 could either be on the text disk 31 or on the optical disk 43, for instance. Moreover, the linkage may also be between illustration and interrelated illustration. For instance, within the scope of the subject invention, touching the callout number 53 for the oil pan drain plug could reproduce a blown-up illustration of that plug, either on the screen 16, or on the monitor 13 in lieu of the complete oil pan illustration.

By way of example, the microcomputer 12, in response to the coordinate signal received via line 28, would pick out the information of the blown-up illustration in our example either from the disk 43 or from another optical disk, video tape or other suitable recording medium.

Again, the possibilities within the scope of the subject invention are almost unlimited, since the touching or other pointing out of any part of any displayed illustration can be transformed into the display of another version or part of that illustration or of any other desired illustration. In this respect, FIG. 2 is already representative of this fact, since it shows a visual display of text, which is also an illustration of sorts, within the broad meaning of that term of a picture, design, diagram, etc., used to decorate or explain something.

With the aid of the subject invention, automotive mechanics and other personnel dealing or handling automotive parts may be given all kind of useful information about practically all they need to know about that subject. Shoppers, on the other hand, are enabled to obtain price and consumer information about a variety of displayed items of interest to them. The subject invention also provides an excellent learning tool, with which students can be given a vast amount of information about a huge number of subjects. Students even can be quizzed in this manner by being prompted to touch the correct one of several possible answers.

The displayed illustration may in fact be a text display, to which a reader points in order to obtain more information about a given item. That further information may, for instance, be an illustration or a more detailed text which is either displayed on the CRT 16 or on the monitor 13 itself, as determined by the microcomputer and its program.

In this respect, once the principle of the subject invention is understood, hardware can be put together or adapted by persons skilled in that area. While special purpose hardware is a conventional possibility in this respect, the modern trend appears to prefer general purpose hardware combined with appropriate software.

In this respect, the subject invention is not limited to the use of any particular component from any particular manufacturer. Indeed, the number of hardware apparatus and software programs with which the subject invention may be carried out or implemented is steadily growing. However, specific items and their interrelationship are presently set forth in this disclosure for the purpose of illustration.

By way of example, monitor 13 may be of the type VR-1000 or another suitable type manufactured by Moniterm Corporation, of Minnetonka, Minn. 55343-9074.

The coordinate sensor 14 may be of the ADDED TOUCH type supplied by Autech Corporation, Columbus, Ohio 43229.

In principle, the touch screen system could really sense where the screen is being touched by the user's finger or by a stylus and the like. However, while touching the screen at a desired illustration or location represents a convenience, no actual touching is necessary, where the position of the finger or stylus is sensed by corresponding vertical and corresponding horizontal arrays of correlated light emitting diodes (LEDs) or other preferably invisible light sources on the one hand and photosensors on the other hand, as incorporated on the touch screen enclosure frame 14.

The display controller 15 preferably is of a sophisticated type. By way of example, the Ω500 Display Controller by Metheus Corporation, of Hillsboro, Ore. 97123, may be employed for that purpose.

The text display 16 may be provided by a video terminal type VT220 by Digital Equipment Corporation, of Concord, Mass. 01742, which also provides keyboards of the type shown at 19.

According to a preferred embodiment, the text display 16 may be integrated with the illustration display at 13.

Various optical disk drive systems are available for use at 45. For instance, the Shugart Optimen 1000 optical disk drive, now supplied by Xerox Corporation, may be used.

The textual disk drive 17 may be part of a package supplied as The Micro VIP by U.S. Design Corporation, of Lanham, Md. 20706. That package includes not only a Winchester disk drive, but also a deck for a tape cartridge 47 usable for back-up/restore, data interchange, software distribution, journaling and storage.

The microcomputer 12 includes a central processing unit (CPU) and a memory in the megabyte range. By way of example, supermicrocomputers of a MicroVAX type, by Digital Equipment Corporation, of Concord, Mass. 01742, may be employed.

These manufacturers also provide all requisite interface, adaptor, multiplexor, input/output and other devices necessary for operation with the microcomputer. It may be noted in this respect that display controllers and apparatus, as well as optical and textual disk drives, of the above mentioned type are designed for operation with a host computer and typically include their own microcomputers which interface with the central microcomputer 12.

The operation of the systems 10 and 100 may be facilitated with suitable database management and other software obtained from several sources, such as from Oracle Corporation, of Menlo Park, Calif. 94025, or from Software House, of Cambridge, Mass. 02138, which publishes the System 1032 Data Base Management System.

The electronic publishing system according to the illustrated preferred embodiment of the invention incorporates an electronic image data base system.

The illustrated preferred embodiment of the invention resides in methods and apparatus 10 and 100 for publishing interrelated illustrations and items of text data by storing these interrelated illustrations and items of text data, such as shown at 23, 32, 33, and 41, establishing data 34 or 36 linking the items of text data to correlated locations in the illustrations, and storing such linking data 34 and 36, as shown, for instance in FIG. 1. As shown with the aid of FIGS. 2 and 3, the retrieval part of the illustrated preferred embodiment retrieves one of the stored illustrations, and provides a display of that retrieved illustration, such as shown at 13 in FIG. 2. The operator or user then selects a desired location in the displayed illustration, such as with the aid of a keyboard 19, X-Y positioner 21, touch screen 14 and finger 27 or 127, and the system 100 employs stored linking data 34 and 36 for retrieving any stored item of text data correlated to the desired location in the displayed illustration, such as the location of any desired displayed callout number 53, etc., or part, such as the drain plug at 53, or other desired part. The item of text data thus retrieved may be displayed, such as in the manner disclosed with the aid of FIG. 2.

A user or viewer of the display at 13 is instructed to point out the desired location in the displayed illustration, such as by a prompting illustrated at the bottom of FIG. 2, and the system 100 effects a determination of the location in the displayed illustration pointed out by the viewer, such as with a finger 27 or 127. The microcomputer 12 employs that determination and stored linking data 34, 36 for retrieving a stored item of text data correlated to the pointed out location in the displayed illustration.

A touch screen may be employed for providing the display of a retrieved illustration. Strictly speaking, the touch screen 14 is the part around the display screen of the monitor 13 which senses where that screen has been touched. However, the monitor screen thus equipped may broadly be referred to as "touch screen," which, with the aid of microcomputer 12, effects a determination of the pointed out location in the displayed illustration by sensing where the screen is being touched, such as by a finger 27 or 127.

A cross hair 29 or other cursor is provided in the display, and users or viewers are enabled to effect movement of that cursor to that pointed out location in the displayed illustration, such as with the aid of an X-Y positioner 21 or arrow keys 30. The microprocessor 12 then effects a determination of the pointed out location in the displayed illustration in response to movement of the cursor or cross hair display 29. This phase of operation may alternatively or additionally be practiced by the operator of the system 10 when capturing coordinates of callout numbers or desired items of displayed illustrations.

A keyboard 19 may be provided for enabling a viewer of the display to identify a location in the displayed illustration about which more information is desired, and the microcomputer 12 employs the recorded linking data 34, 36 in conjunction with the keyboard for retrieving a stored item of text data correlated to the identified location in that displayed illustration.

According to a preferred embodiment of the invention, each or any illustration is provided with indicia 51 to 58 of items shown in that illustration, and such indicia are stored. Linking data are then established by correlating items of text data to locations of indicia 51, 52, 53, etc. of corresponding items shown in the illustration. The latter linking data are also stored, such as shown at 34 and 36. The stored indicia are retrieved and such retrieved indicia are displayed in the display of the retrieved illustration, such as shown in FIG. 2. The desired location in the displayed illustration is then selected in terms of a location of an indicium, such as the callout number 53 of a desired item shown in the displayed illustration, such as the oil pan drain plug at 53. The system 100 employs the latter stored linking data for retrieving an item of text data correlated to said desired item shown in said displayed illustration, such as explained above with the aid of FIG. 2, including the text display at 16.

The system 100 then instructs a viewer of the display and displayed indicia 51 to 58 to point out the indicium of the desired item shown in that displayed illustration, such as by prompting the viewer in the manner shown at the bottom of FIG. 2. Touch screen 14 and microcomputer 12 effect a determination of the location of the indicium pointed out by the viewer, such as the callout number 53 shown in FIG. 2, and employ that determination and the stored linking data 34, 36 to retrieve the item of text data correlated to the desired item shown in the displayed illustration.

As explained with the aid of a further finger 127 in FIG. 2, an operator or user, or a viewer of the display sometimes attempts to indicate a selection of a desired location by pointing to a location in the displayed illustration other than any of the locations at which displayed items or indicia 51 to 58 are located. In such cases, and according to an embodiment of the invention, the microcomputer 12 or other means electronically calculates the distances between the location pointed to by the aberrant finger 127 and adjacent ones of the locations of items or indicia shown in the displayed illustration and determines the desired location as the location having the shortest distance from the pointed to location in the displayed illustration. This may also be expressed in terms of distances from the pointed to location to adjacent displayed items, indicia or call numbers.

For example, if the indicia are displayed as call numbers 51 to 58 for the items shown in the illustration, such as the displayed illustration shown in FIG. 2, a viewer of that display may attempt to indicate a selection of a desired item by pointing to a location other than any of said locations of indicia, as shown at 127 adjacent the call number 53. In that case, the illustrated method and apparatus electronically calculate the distances between the actually pointed to location and adjacent ones of said indicia or call numbers 51 to 58 in the displayed illustration and determine the location of the intended or selected indicium of the desired item as the location having the shortest distance from said pointed to location in the displayed illustration. In the example shown in FIG. 2, that closest indicia is the call number 53 for the closest item shown in the displayed illustration.

As explained above with the aid of FIGS. 1 and 2, a co-ordinate capture system according to a preferred embodiment of the invention displays each illustration, such as at 13, and displays items of text data, such as at 16, correlated to locations in each displayed illustration, such as by indicia call numbers 51 to 58. Co-ordinates of the latter locations or indicia are individually determined in each displayed illustration, such as with the aid of X-Y positioner 21, keys 30 and micocomputer 12, which also associates the determined co-ordinates with correlated items of text data for establishing the above mentioned linking data.

The subject invention also resides in records of interrelated illustrations and items of text data recorded on disks 31 and 43 or otherwise fixed in tangible media by any of the methods and apparatus disclosed herein with the aid of FIGS. 1 and 2. In this respect, records 32, 33, 34, 36, 41 and 42 may be present on a single disk, recording tape or other medium, or may be located on correlated media, as shown in FIG. 3, for instance. These records are of superior quality as compared to prior-art records produced by methods or systems other than those of the subject invention. Also, records made according to the subject invention enable the retrieval of stored items of text data in a manner correlated to desired locations, indicia or items of displayed illustrations, as herein disclosed.

The subject extensive disclosure renders apparent or suggests to those skilled in the art various modifications or variations within the spirit and scope of the invention and of equivalents thereof.

We claim:
1. An electronic parts catalog system comprising:
an illustration memory means for storing electronic representations of a plurality of pictorial illustrations, each illustration showing a plurality of parts with each of the parts being associated with a corresponding coordinate location of the pictorial illustration, each of the electronic illustration representations being identified by an illustration identification;
a text memory means for storing electronic text representations of descriptive text of the parts of each of the plurality of illustrations, each electronic text representation being identified by the illustration identification of the illustration in which it appears and by the corresponding coordinate location associated with the corresponding part;
a selecting means with which a human user inputs a selection of one of the illustrations for display, the selecting means being connected with the illustration memory means for conveying a selected illustration identification thereto;
a monitor means for converting the electronic illustration representation corresponding to the selected illustration identification into a human-readable pictorial display in which each of the plurality of displayed parts is displayed in association with its corresponding coordinate location, the monitor means being connected with the illustration memory means for receiving the electronic illustration representations therefrom;
a user input means for designating a desired coordinate on the human-readable pictorial display;
a microprocessor means for (i) determining a distance between the designated desired coordinate and each of the corresponding coordinate locations of the text representations corresponding to the selected illustration identification and (ii) determining which one of the corresponding coordinate locations is closest to the designated desired coordinate, the microprocessor means being connected with the text memory means for causing the text representation that is identified by the determined closest corresponding coordinate location to be converted into a human-readable text display.

2. The system as set forth in claim 1 wherein the user input means includes a touch sensitive screen which is responsive to a structure immediately adjacent the screen for generating the desired coordinate.

3. The system as set forth in claim 1 wherein the illustration memory means includes an optical disk drive and the text memory means includes a magnetic disk drive.

4. A method of electronic publishing comprising:
storing electronic representations of pictorial illustrations in an illustration memory means, each illustration being defined by a multiplicity of pixel values corresponding to unique pixel location coordinates, each representation being identified by an illustration identification code;
storing a plurality of electronic text item representations of text descriptions of portions of the pictorial illustrations and corresponding call out symbols in a text memory means, each text item representation being identified by the corresponding callout symbol, each callout symbol being identified by a preselected corresponding pixel location coordinates of the corresponding pictorial illustration, the text item representations, the callout symbols, and the preselected corresponding pixel location coordinates being much smaller in number than the multiplicity of unique pixel location coordinates, such that there are no text item representations corresponding to many of the pixel location coordinates;
after storing a plurality of electronic text representations, text item representations, and callout symbols, addressing the illustration memory means with a selected one of the illustration identification codes to retrieve the corresponding electronic illustration representation;
converting each pixel value of the retrieved corresponding electronic illustration representation into an element of a human-readable pictorial display on a video monitor, each element of the pictorial display being displayed at a corresponding one of the multiplicity of pixel location coordinates;
selecting a desired location on the pictorial display displayed on the video monitor;
with a microprocessor, determining a distance between the selected desired location and the location coordinates of each callout symbol that corresponds to the displayed pictorial display on the video monitor to determine the most proximate one of the preselected location coordinates to the selected desired location and determining the callout symbol identified by the location coordinate most proximate to the selected location; and, retrieving from the text memory means the text representation corresponding to the callout symbol whose preselected location coordinate is most proximate to the selected location and converting the retrieved text representation into a human-readable text display.

5. A method of electronic publishing comprising:

storing electronic image data records in an illustration memory means, each record representing a pictorial illustration made up of a multiplicity of pixels at pixel coordinates, each illustration being identified by an illustration identification;

storing items of text data in a text memory means;

generating linking data for linking the stored text data items to correlated locations within the pictorial illustrations by:

inputting the illustration identification code identifying a desired pictorial illustration into the illustration memory means;

retrieving the image data record corresponding to the input illustration identification code from the illustration memory means;

converting the retrieved image data record, from the illustration memory means into a human-readable display of the corresponding pictorial illustration on a human-readable display means which illustration includes callout symbols, each callout symbol being associated with a corresponding feature of the displayed illustration and being associated with at least one corresponding stored text item;

retrieving a text data item from the text memory means associated with each callout character of the displayed pictorial illustration;

converting the retrieved text data items into a human-readable display of corresponding text;

determining a callout symbol coordinate on the displayed pictorial illustration over which each callout symbol is displayed; and, storing each callout symbol coordinate in logical association with the corresponding callout symbol;

selecting a desired image record from the plurality of stored image records and converting the selected image record into a display on the human-readable display means of the corresponding pictorial illustration including the plurality of callout symbols at the determined callout symbol coordinates;

selecting a location on the displayed illustration;

determining a one of the callout symbol coordinates that is a closest distance to the selected location;

retrieving a one of the stored text data items which corresponds to the displayed callout symbol that corresponds to the determined closest one of the callout symbol coordinates; and, converting the retrieved text data item into a human-readable text display on the human-readable display means.

6. A method of operating an electronic publishing system having a storage medium for storing a plurality of illustrations as image data records, a plurality of textual information sets having items of text data, each text data item being addressed by a corresponding one of a multiplicity of coordinates of a human-readable display, a human readable display means connected with the storage medium for converting the image and text data records to the human-readable displays, the method comprising the steps of:

retrieving an image data record corresponding to a selected illustration from the storage medium;

converting the retrieved image data record into a pictorial illustration on the human-readable display;

determining a one of the multiplicity of coordinates which corresponds to a selected location on the human-readable display;

determining with an electronic processor means which one of the coordinates corresponding to the text data items is closest to the selected one of the multiplicity of coordinates of the human-readable display means;

retrieving a stored text data item from the storage medium which corresponds to the; and, displaying the retrieved item of text data on the human-readable display means.

7. The method as set forth in claim 6, wherein the displayed image data record includes callout symbols each located at a corresponding one of the text data item coordinates and further comprising the step of:

displaying an operator prompt along with the displayed illustration soliciting selection of one of a plurality of callout characters corresponding to desired features of the displayed illustration.

8. An electronic catalog system comprising:

a human-readable display means for converting (1) a selected electronic illustration representations and (2) electronic text representations into human-readable displays, each of the human-readable displays having a multiplicity of coordinate locations;

an illustration memory means for storing a plurality of the electronic illustration representations, each of the electronic illustration representations being identified by an illustration identification, the illustration memory means being connected with the human-readable display means for conveying one of the electronic illustration representation to the human-readable display means to be converted into the human-readable display;

a text memory means for storing a plurality of the electronic text representations corresponding to each electronic image representation, each electronic text representation being identified by a corresponding one of the multiplicity of coordinate locations, the multiplicity of coordinate locations being larger in number than the plurality of text representations such that only a first fraction of the multiplicity of coordinate locations correspond to one of the text representations and a second fraction of the multiplicity of coordinate locations correspond to no text representation, the text memory means being connected with the human-readable display means for conveying text representations thereto to be converted into the human-readable display;

a user selection means with which a human user selects one of the electronic illustration representations and one of the multiplicity of coordinate locations, the selection means being operatively connected with the illustration memory means for conveying the illustration representation selection thereto to cause the corresponding electronic illustration representation to be conveyed to the human-readable display;

a means for determining distances between the selected coordinate location and the first fraction of the multiplicity of coordinate locations and identifying a one of the first fraction of coordinate locations which is a closest distance to the selected coordinate location, the text memory means being connected with the determining means to be addressed by the closest coordinate location to cause the corresponding electronic text representation of the selected illustration representation to be conveyed to the human-readable display.

* * * * *